Patented Apr. 21, 1931

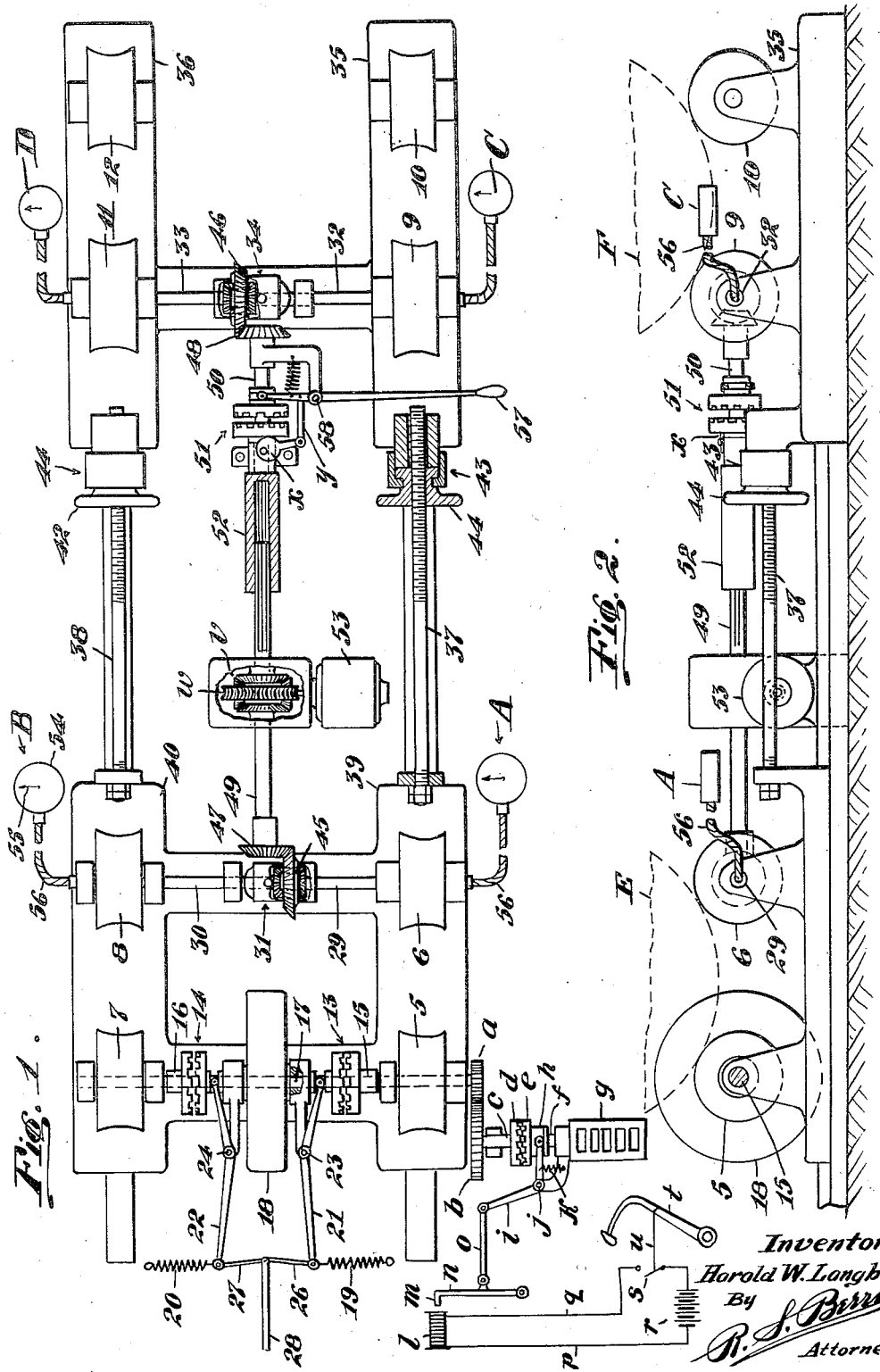

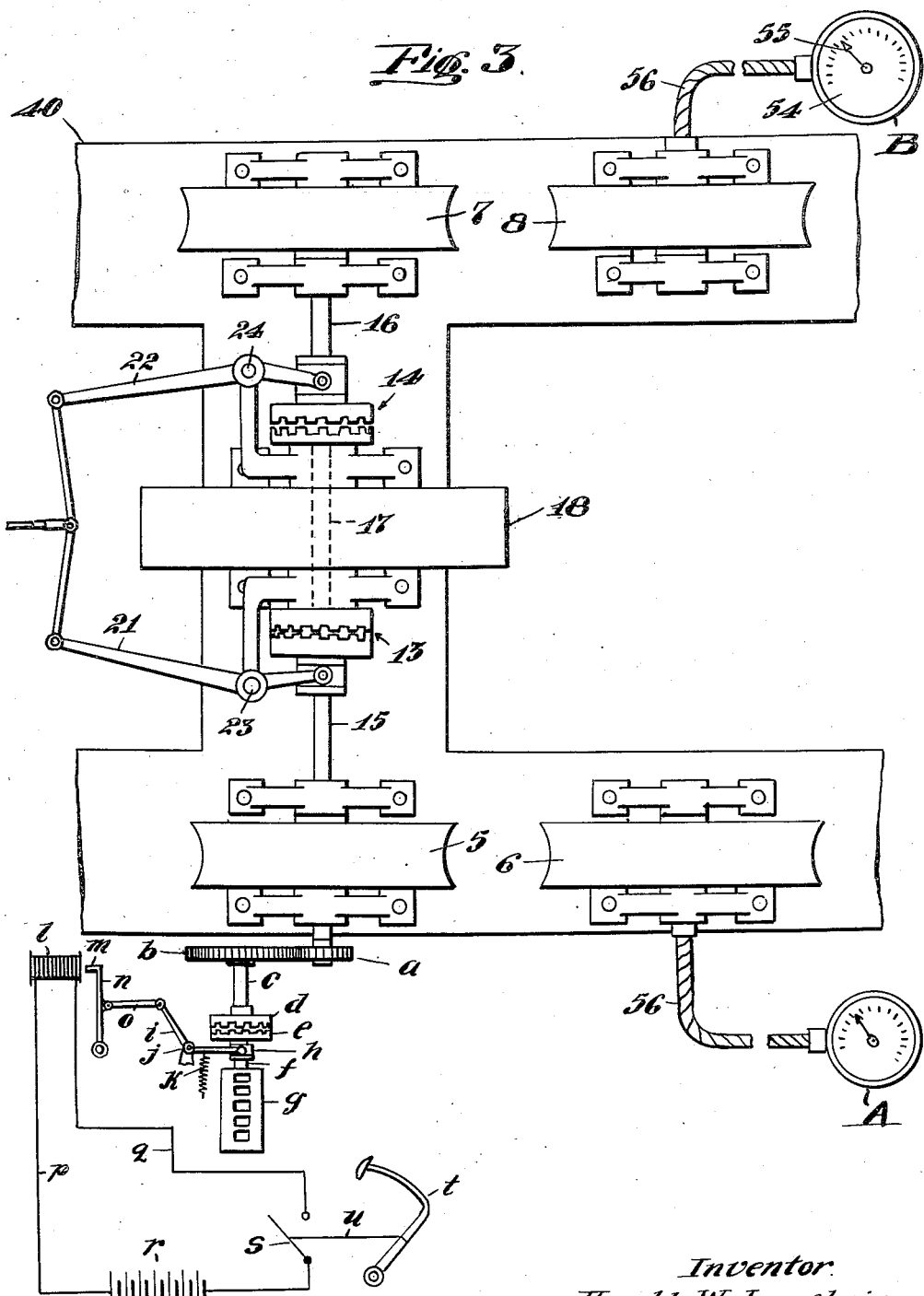

1,801,927

UNITED STATES PATENT OFFICE

HAROLD W. LANGBEIN, OF LOS ANGELES, CALIFORNIA, ASSIGNOR TO BRAKE SYN-CHROMETER CO., OF BOSTON, MASSACHUSETTS, A CORPORATION OF MASSACHUSETTS

BRAKE-TESTING MACHINE

Application filed December 5, 1925. Serial No. 73,476.

This invention relates to a device for facilitating adjustment of the brakes of motor vehicles and particularly pertains to improvements in brake testing mechanisms of the character set forth in my patent 1,746,780 granted Feb. 11, 1930.

The primary object of the invention is to provide a means whereby the relative brake pressures of a plurality of vehicle brakes simultaneously applied may be determined to the end of enabling such adjustment of one or more of the brakes, or brake operating mechanisms of the vehicle, as may be necessary in order to establish equalization of the brake pressures, and whereby the relative braking effect of at least two vehicle brakes may be coincidently determined with a high degree of accuracy, and whereby the braking action may be readily tested without the necessity of road tests as is generally practiced.

Another object is to provide a brake testing machine which is applicable for use in testing four wheel brakes, both as to their relative braking pressures when applied and as to their capability of bringing the vehicle to a stop when travelling at a predetermined speed, and to provide means whereby the machine may be adjusted to accommodate vehicles having different lengths of wheel base.

A further object is to provide a brake testing machine of the above character in which driving of the vehicle wheels during testing may be effected either through the motive power of the vehicle or from an auxiliary source.

With the foregoing objects in view, together with such other objects and advantages as may subsequently appear, the invention resides generally in the provision of a rack embodying rollers on which the wheels of a vehicle may be supported; there being a pair of such rollers for each of the vehicle wheels, and also resides in fitting one of the wheels of each pair with a tachometer or instrument operable on rotation of the roller to indicate its rate of rotation by revolutions per minute, whereby any difference in relative speed of rotation of the several rollers may be determined; and further resides in the provision of a means whereby a forward pair of the vehicle wheels may be rotated in unison with rotation of the rearward or driving wheels when both pairs of said wheels are supported on the rollers, and operable either by the motive power of the vehicle or from a separate source of power.

The invention further resides in the parts and in the combination and arrangement of parts hereinafter described and claimed and illustrated by way of example in the accompanying drawings, in which:—

Fig. 1 is a plan view of a preferred embodiment of the invention, portions being shown in horizontal section and parts being depicted diagrammatically;

Fig. 2 is view in side elevation.

Fig. 3 is a plan view illustrating a modified form of the invention.

Referring to the drawings more specifically, in Figs. 1 and 2 the vehicle wheel supporting rollers are indicated at 5, 6, 7, 8, 9, 10, 11 and 12; the rollers 5 and 6 constituting a pair of rollers relatively aligned lengthwise of a vehicle to be tested and adapted to support one of the rear wheels of the vehicle; the rollers 7 and 8 constituting a second pair of similarly aligned rollers adapted to support the other rear driving wheel of the vehicle, rollers 9 and 10 constituting a pair of rollers for supporting one of the front wheels of the vehicle and the rollers 11 and 12 constituting a pair of rollers for supporting the other front wheel of the vehicle. The rollers 5, 6, 9 and 10 are arranged in alignment longitudinally of the vehicle to be tested and at one side of the apparatus and the rollers 7, 8, 11 and 12 are arranged similarly at the other side of the apparatus with the rollers of each pair spaced apart and with the rearward pairs of rollers spaced from the foreward pairs of rollers such distance that the four wheels of a vehicle may be simultaneously supported on these pairs of rollers. The rollers 5 and 7 are idlers and are normally independent of each other but are designed to be interconnected by means of clutches 13 and 14 operable to connect aligned shafts 15 and 16 carrying the rollers 5 and 7 to an intermediate shaft 17 carrying a fly wheel 18; the clutches 13 and 14 being normally disposed in release by means of springs 19 and 20 pulling on levers 21 and 22 pivoted at 23 and 24 having their inner ends connecting with clutch sleeves on movable clutch members as is common in clutch operating mechanisms.

Means are provided for operating the levers 21 and 22 in opposition to the springs 19 and 20 to engage the clutches 13 and 14, when it is desired to connect the rollers 5 and 7, which means is here shown as comprising a pair of links 26 and 27 connecting the outer ends of the levers 21 and 22 to a push rod 28 whereby on inward longitudinal movement on the push rod the outer end portions of the levers 21 and 22 will be drawn toward each other and thereby effect engagement of the clutch members. Mounted on the shafts carrying either the roller 5 or 7 is a pinion $a$ meshing with a gear $b$ on a shaft $c$ carrying a clutch member $d$ adapted to be engaged in a shiftable clutch member $e$ splined on a shaft $f$ operatively connected to a counter $g$. The clutch member $d$ is fitted with a sleeve $h$ connected to a yoke on a bell-crank lever $i$ pivoted at $j$ and which clutch member is normally disposed out of engagement with the clutch member $d$ by means of a spring $k$ and is designed to be thrown into engagement with the clutch member on energization of an electro-magnet $l$ through the medium of an armature $m$ carried on an arm $n$ connecting with the lever $i$ through a link $o$. The coils of the electro-magnet $l$ connect with conductors $p$ and $q$ leading to the terminations of a battery $r$ through a normally open switch $s$ adapted to be closed on depression of a brake operating lever $t$ on the vehicle being tested; a suitable connection $u$ being provided between the switch and the brake operating lever. The gears $a$ and $b$ are proportioned relatively to the diameter of the roller 5 and to the diameter of the vehicle wheel supported on the rollers 5 and 6 as to operate the counter $g$ to register each rotation of the vehicle wheel; the gears $a$ and $b$ being varied, as occasion requires.

The connections to the rollers 5 and 7 just described constitute a mechanism for determining the actions of the vehicle brakes in bringing the vehicle to a stop on the application of its brakes, as will presently be described.

The rollers 6 and 8 are carried on shafts 29 and 30 which shafts connect with conventional differential gear mechanisms in a housing 31 which differential operates in the usual manner to permit rotation of the rollers 6 and 8 at different relative speeds. The rollers 9 and 11 are carried on shafts 32 and 33 connected with a differential gear assemblage in a housing 34. The rollers 10 and 12 are idlers and are mounted to rotate independently of each other.

The pairs of rollers 9—11 and 10—12 are journalled in suitable bearings carried on a slide frame embodying connected side members 35 and 36 slidable longitudinally in suitable guideways to permit disposing of the forward pairs of rollers at various distances from the rearward pairs of rollers so as to accommodate vehicles having different lengths of wheel base.

As a means for facilitating shifting of the slide frame a pair of stationary threaded shafts 37 and 38 are fixed to frame members 39 and 40 which shafts extend horizontally and parallel and are screwed into engagement with hand wheels 41 and 42 rotatably mounted on supports 43 and 44 carried by the frame members 35 and 36, respectively, which hand wheels are operable on rotation thereof to effect movement of the slide frame with relation to the frame members 39 and 40, which latter are fixed.

The rollers 6 and 8 are operatively connected to the rollers 9 and 11 by a suitable transmission mechanism here shown as embodying beveled gears 45 and 46 fixed on the shafts 29 and 32, pinions 47 and 48 meshing with the gears 45 and 46, respectively, a shaft 49 carrying the pinion 47, a shaft 50 carrying the pinion 48, and a clutch 51 for connecting the shaft 50 to a sleeve 52 splined on the shaft 49. This transmission mechanism affords a means whereby impelling of the rollers 6 and 8 will effect rotation of the rollers 9 and 11 as where the rollers 6 and 8 are driven by rotation of the vehicle wheels supported thereon from the driving mechanism of the motor vehicle whereby rotation of the rollers 9 and 11 will effect rotation of the vehicle forward wheels in unison with the rear wheels of the vehicle.

As a means for enabling driving of the vehicle wheels independently of the vehicle drive, an electric motor 53 is arranged to drive the shaft 49 through a differential gear mechanism $v$ embodying a worm ring gear $w$ engaged by a worm on the drive shaft of the motor 53 as is common in worm gear transmission mechanism; the worm gear $w$ carrying the usual beveled gears connecting with beveled gears on the divided shaft 49. When rotation of the shaft 49 is effected from the rollers 6 and 8, the sleeve 52 will be rotated through the intermeshing gears of the differential $v$; this operation occuring by reason of the worm ring gear $w$ being then held against rotation because of its engagement with the worm on the motor drive shaft; the worm transmission not being reversible as is well known. Driving of the shaft 49 will thus not effect rotation of the motor shaft.

Operatively connected to each of the wheels 6, 8, 9 and 11 are speed responsive devices A, B, C and D for indicating revolutions per minute, which devices are commonly known as tachometers and may be of any suitable construction, being here shown as embodying a graduated dial 54 and a pointer 55 actuated by the tachometer operating mechanism to traverse the dial and indicate thereby the number of revolutions per minute of the rollers to which the tachometers are operatively connected. While I have shown the several tachometers as disposed adjacent their respective rollers it will be understood that in practice they may be positioned collectively on an instrument board and arranged so that the readings of the several tachometers relatively to each other may be readily compared; the tachometers being independently operated through flexible shafts 56 connected with their operating rollers.

Where the invention is to be employed in testing vehicles having only two wheel brakes the forward pairs of rollers 9, 10, 11 and 12 and their associated parts including the driving connections to the rollers 9 and 11 may be dispensed with and only the rollers 5, 6, 7 and 8 employed as a support for the rear driving wheels of the vehicle in which event the arrangement shown in Fig. 3 serves the purpose. As the elements depicted in Fig. 3 correspond to those shown in Fig. 1, like parts are designated by the same reference characters and having been previously explained herein need not be further described.

In the operation of the invention the vehicle on which the brakes are to be tested is disposed with its rear driving wheels supported on the rollers 5, 6, 7 and 8 and if the vehicle is equipped with four wheel brakes its front pair of wheels are supported on the rollers 9, 10, 11 and 12, as indicated in dotted lines E and F in Fig. 2. In determining the relative braking action of the vehicle brakes rotation of the vehicle wheels is effected so as to cause rotation of the rollers on which they are supported. This rotation of the vehicle wheels may be accomplished through the medium of the impelling mechanism of the vehicle in which event the vehicle clutch is disposed in its engaged position, and the vehicle transmission placed in gear, and the vehicle motor operated so as to effect rotation of the rear driving wheels E in the usual manner and thereby impart rotative movement to the rollers 5, 6, 7 and 8. If the vehicle is equipped with brakes on its forward wheels F the clutch 51 is placed in its engaged position by operating a hand lever 57 pivoted at 58, whereupon the rollers 9 and 11 will be driven in unison with the rollers 6 and 8 through the instrumentality of the shaft 49 and its gear connections with the shafts 29 and 32. This rotation of the rollers 9 and 11 will effect rotation of the vehicle front wheels F in unison with the rotation of its rear wheels E. Rotation of the rollers 6, 8, 9 and 11 will actuate the tachometers A, B, C and D, which will indicate the revolutions per minute of the rollers and as the rollers then revolve in unison the readings of the several tachometers will correspond. The vehicle brakes are then applied to effect retardation of the vehicle wheels which will effect a corresponding retardation of the rotation of the rollers 6, 8, 9 and 11. If the several brakes are properly equalized they will have corresponding retarding action on the vehicle wheels in which event the readings of the tachometers A and B will correspond and the readings of the tachometers C and D will correspond, but since in four wheel brake equipments it is the practice to adjust the forward brakes to have less braking action than the rearward brakes the readings of the tachometers C and D will be greater than those of the tachometers A and B.

As a means for permitting rotation of the forward rollers 9 and 11 at greater speed relatively to the rotation of the rollers 6 and 8 and at the same time facilitate adjustment of the vehicle brakes so that the brakes acting on the rear wheels will apply before application of the brakes on the forward wheels take place, the differential gear $v$ including the worm ring gear $w$ is interposed in the shaft 49 through which driving of the latter from the motor 53 is effected by means of the usual worm on the motor drive shaft meshing with the worm ring gear as before described.

In event either of the vehicle brakes is out of adjustment so as not to have the same braking action as its companion brakes there will be a difference in the relative retarding effect of the brakes on the vehicle wheels, and accordingly, the wheels will rotate at different peripherial speeds which is permitted by reason of the vehicle's differential gear connection. This difference in relative peripherial speeds of the vehicle wheels will be immediately indicated by the tachometers so that the operator may readily determine which of the brakes require adjustment and to what extent, and accordingly, he may readily adjust the brakes to effect their proper relative action.

In instances where the motive power of the vehicle is not available as a means for rotating the driving wheels, rotation of the rollers 6, 8, 9 and 11 and of the vehicle wheels supported thereon will be affected through the instrumentality of the motor 53, shaft 49 and the connections between the later and the shafts 29 and 32, whereupon the testing of the brakes will be accomplished in the manner before described.

Where it is only required to test the brakes on the rear driving wheels of a vehicle, it is only necessary to effect rotation of the rear wheels of the vehicle and the group of rollers on which they are supported, and accordingly, the forward groups of rollers need not then be employed, and they may be either dispensed with, as shown in Fig. 3, or they may be placed out of operation by disengaging the members of the clutch 51 as shown in Fig. 1. Where it is desired to effect rotation of the rollers 6 and 8 from the motor 53 with the clutch 51 disengaged, means are provided for holding the sleeve 52 against rotation so as to permit driving the end portion of the shaft 49 carrying the pinion 47 from the motor 53 through the differential $v$ which means is here shown as embodying a brake $x$ connected by a link $y$ to the lever 57 in such manner that when the latter is operated to disengage the clutch members 51 the brake $x$ will be disposed in operative engagement with the clutch members connected to the sleeve 52 so as to inhibit rotation of the latter.

After having effected proper adjustment and relative equalization of the brakes, the effectiveness of the brakes in stopping movement of the vehicle may be tested without removing it from its position from the tester. This is accomplished in the following manner:

The clutches 13 and 14 are engaged so as to effect a positive connection between the rollers 5 and 7 through the intermediate shaft 17 carrying the fly wheel 18; the clutches being operated by actuation of the push rod 28 to rock the levers 21 and 22 in opposition to the springs 19 and 20. The wheels of the motor vehicle resting on the rollers 5, 6, 7 and 8 are then set in motion by operation of the vehicle motor or through the instrumentality of the motor 53 as before described and are brought up to a predetermined peripheral speed according to indications of the vehicle speedometer, whereupon the vehicle brakes are fully applied by operation of the brake lever $t$. This operation of the brake lever closes the switch $s$ so as to complete the electrical circuit through the electro-magnet $l$ to effect energization thereof and thereby attract the armature $m$ and rock the arm $n$ and the lever $i$ to move the clutch member $e$ into engagement with the clutch member $d$ and thereby dispose the counter $q$ in operative connection with the roller 5 through the gears $a$ and $b$ being driven from the roller 5 as the latter revolves under the action of the rotation of the vehicle wheel imposed thereon. This interconnecting of the counter $g$ and the roller 5 will occur coincident with operation of the lever $t$ in effecting operation of the vehicle brakes so that from the moment the brakes are applied the counter $g$ will register the number of revolutions of the vehicle wheel until the latter is brought to rest under the action of the brakes. The diameter of the vehicle wheel and the number of its revolutions being known the theoretical distance traversed by the wheel in bringing it to a stop may then be readily computed.

An important feature of the invention resides in the provision of the fly wheel 18 which wheel will operate by reason of its weight and momentum during its rotation through the medium of the rollers 5 and 7 to oppose retardation of the vehicle wheels under the action of the vehicle brakes and to impart a rotative effect on the vehicle wheels in opposition to the vehicle brakes and thus serve as a means of affording the equivalent of momentum of a vehicle when traversing a road way, so that in testing the effectiveness of the vehicle brakes in bringing the vehicle to a stop substantially the same conditions will be created in the testing machine as would be present in making a road test.

While I have shown and described a specific embodiment of my invention, I do not limit myself to the exact details of construction and arrangement shown but may employ such changes and modifications as come within the spirit and scope of the invention set forth in the appended claims.

I claim:—

1. In a vehicle brake testing machine, a group of two pair of aligned rollers for supporting the rear wheels of a vehicle, two tachometers respectively operatively connected to one of the rollers of each pair, a second group of two pairs of aligned rollers for supporting the front wheels of the vehicle, two tachometers respectively operatively connected to one of the rollers of each of said last named pairs of rollers, and means operable on rotation of the tachometer operating rollers of said first mentioned group of rollers to effect rotation of the corresponding rollers of the second group of rollers.

2. In a machine for testing vehicle brakes, a group of two pair of rollers for supporting the rear wheels of a vehicle, two tachometers respectively operatively connected to one of the rollers of each pair, a second group of two pair of rollers for supporting the front wheels of the vehicle, two tachometers respectively operatively connected to one of the rollers of each of said last named pair of rollers, means for adjusting the two groups of rollers to different spaced relations relative to each other, and means whereby rotation of the tachometer operating rollers of one group will effect rotation of the corresponding rollers of the other group.

3. In a vehicle brake testing machine, a group of two pair of rollers for supporting the rear wheels of a vehicle, a second group of two pairs of rollers for supporting the front wheels of a vehicle, a motor, means operable by said motor for effecting rotation of two opposed rollers of each group of rollers, and a tachometer operatively connected to each of the rollers rotated by said motor.

4. The structure called for in claim 1, and means operable by opposed rollers in the first named group for registering the number of rotations of the vehicle wheels supported on said rollers.

5. In a vehicle brake testing machine, a group of two pair of rollers for supporting the rear wheels of a vehicle, a second group of two pair of rollers for supporting the front wheels of a vehicle, connections between opposed rollers in one group and opposed rollers in the other group whereby said rollers may be rotated collectively operable to permit rotation of each of the rollers at varying speeds relatively to the rotation of the other of said rollers, and means for independently indicating the revolutions per minute of each of said interconnected rollers.

6. In a vehicle brake testing machine, two rollers for engagement with the rear wheels of a vehicle, shafts carrying each of said rollers, differential gears interposed between said shafts, two rollers arranged to engage the front wheels of the vehicle, shafts carrying said last named rollers, differential gears interposed between said last named shafts, connections whereby rotation of said first named rollers will effect rotation of said last named rollers, and means independently indicating the revolutions per minute of each of said rollers.

7. In a vehicle brake testing machine, rollers engageable with the rear wheels of a vehicle, shafts carrying said rollers, a differential gear interposed between said shafts, rollers engageable with the front wheels of a vehicle, shafts carrying said rollers, a differential gear interposed between said last named shafts, a motor, a differential gear driven by said motor, means operable to drive said first named rollers from said motor-driven differential, connections operable to drive said last named rollers from said motor-driven differential, a tachometer operatively connected to each of said rollers, and means whereby the first named rollers may be driven from said motor independently of the last named pair of rollers.

8. In a vehicle brake testing machine, a set of rollers for engaging the rear wheels of a vehicle, shafts carrying said rollers, a differential gear interposed between said shafts, a set of rollers for engaging the front wheels of a vehicle, a motor, a differential gear directly driven by said motor, means for driving one set of rollers from said motor driven differential gear connecting with the first named differential gear, a shaft leading from said motor driven differential, a transmission connection between said shaft and the last named differential gear, a clutch in said transmission connection, and means for holding said last named shaft against rotation when said clutch is disengaged.

9. In a vehicle brake testing device, a pair of rollers, each roller adapted to receive and support a rear wheel of a motor vehicle, said rollers to be driven in unison with the vehicle wheels resting thereon, and means in co-action with the rollers for storing up kinetic energy substantially equal to the kinetic energy of the vehicle when traveling on a roadway at predetermined speed and means for visibly indicating the speed at which the vehicle would be traveling on a road when the rear wheels and rollers are rotating, releasably engaged means whereby the rollers may be rotated in unison, and means for releasing said engagement means whereby the rollers may be rotated independently of each other.

In testimony whereof, I have affixed my signature.

HAROLD W. LANGBEIN.